Oct. 16, 1951 R. H. RINES 2,571,612

STEREOSCOPIC IMAGE RECEPTION BY MILLIMETRIC RADIATION

Filed Feb. 24, 1948 6 Sheets-Sheet 1

Inventor
Robert H. Rines
by David Rines
Attorney

STEREOSCOPIC IMAGE RECEPTION BY MILLIMETRIC RADIATION

Inventor
Robert H. Rines
by David Rines
Attorney

STEREOSCOPIC IMAGE RECEPTION BY MILLIMETRIC RADIATION

Inventor
Robert H. Rines
by David Rines
Attorney

Inventor
Robert H. Rines
by David Rines
Attorney

STEREOSCOPIC IMAGE RECEPTION BY MILLIMETRIC RADIATION

Filed Feb. 24, 1948 6 Sheets-Sheet 5

Inventor
Robert H. Rines
by David Rines
Attorney

Inventor
Robert H. Rines
by David Rines
Attorney

Patented Oct. 16, 1951

2,571,612

UNITED STATES PATENT OFFICE 2,571,612

STEREOSCOPIC IMAGE RECEPTION BY MILLIMETRIC RADIATION

Robert H. Rines, Cambridge, Mass.

Application February 24, 1948, Serial No. 10,867

52 Claims. (Cl. 178—6.5)

The present invention relates to electric systems, and more particularly to radio-wave receiving systems that, while having more general fields of usefulness, are especially adapted for use in television. This application is a continuation-in-part of application Serial No. 527,374, filed March 18, 1944, now abandoned.

An object of the present invention is to provide a new and improved radio-locator system for both detecting the presence of a body and rendering it stereoscopically visible.

Other and further objects will be explained hereinafter and will be more particularly pointed out in the appended claims.

Figure 1:
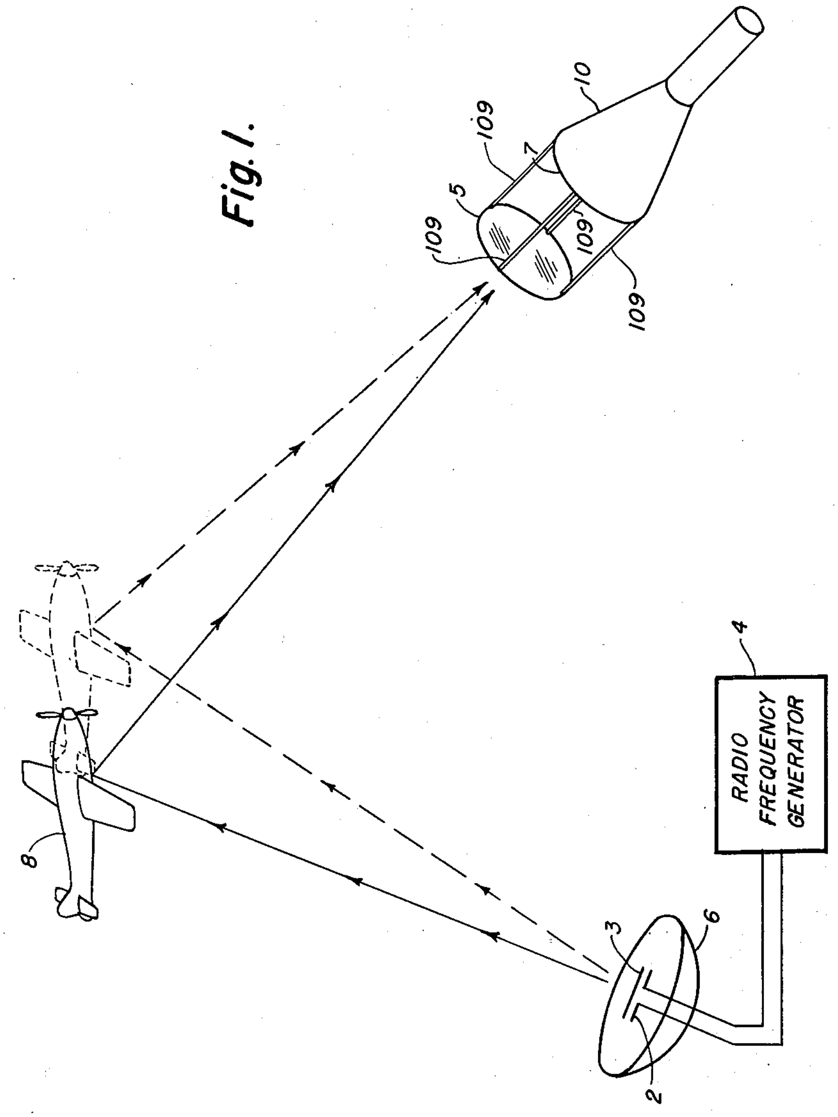
Figure 2:
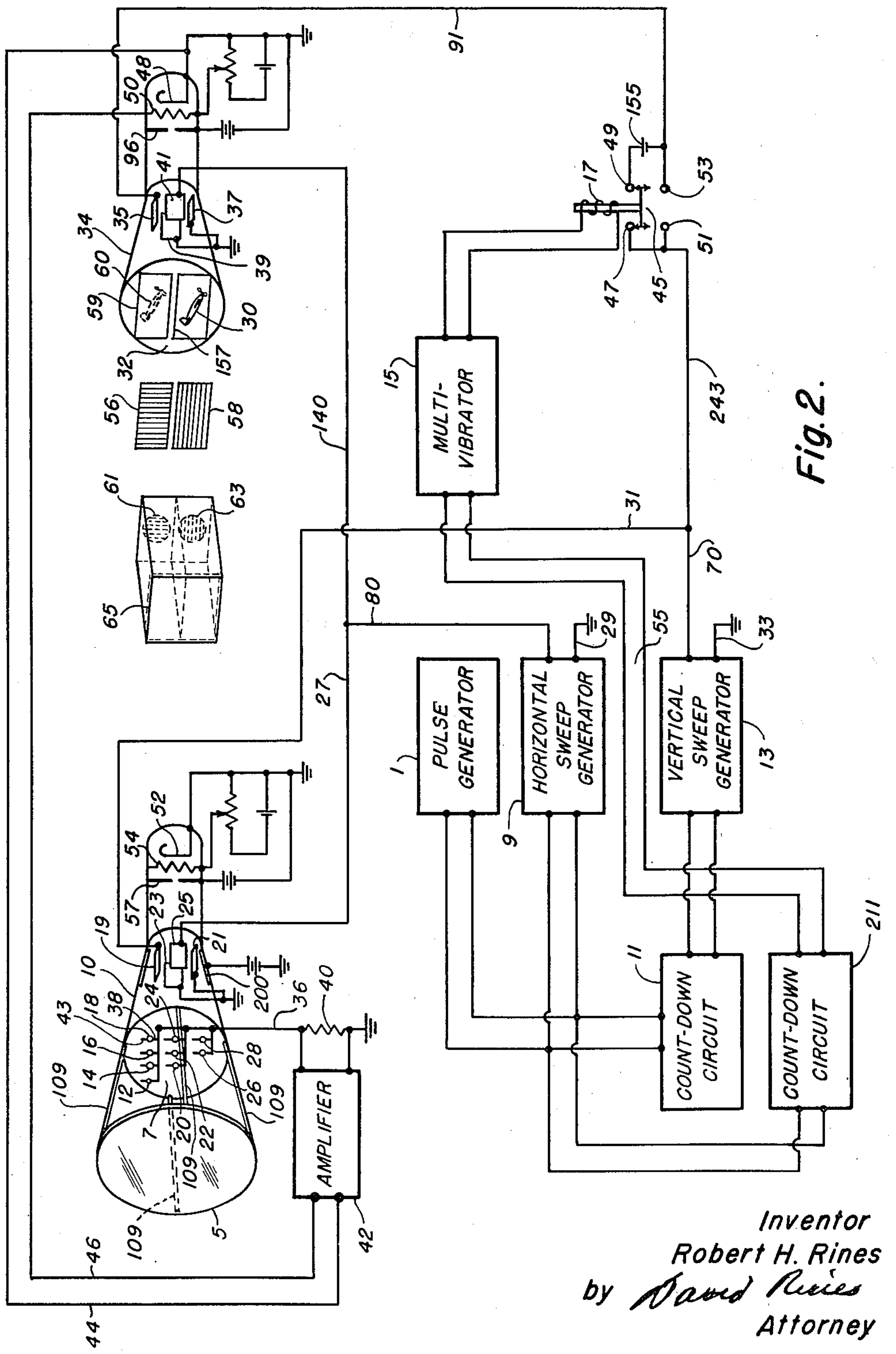
Figure 3:
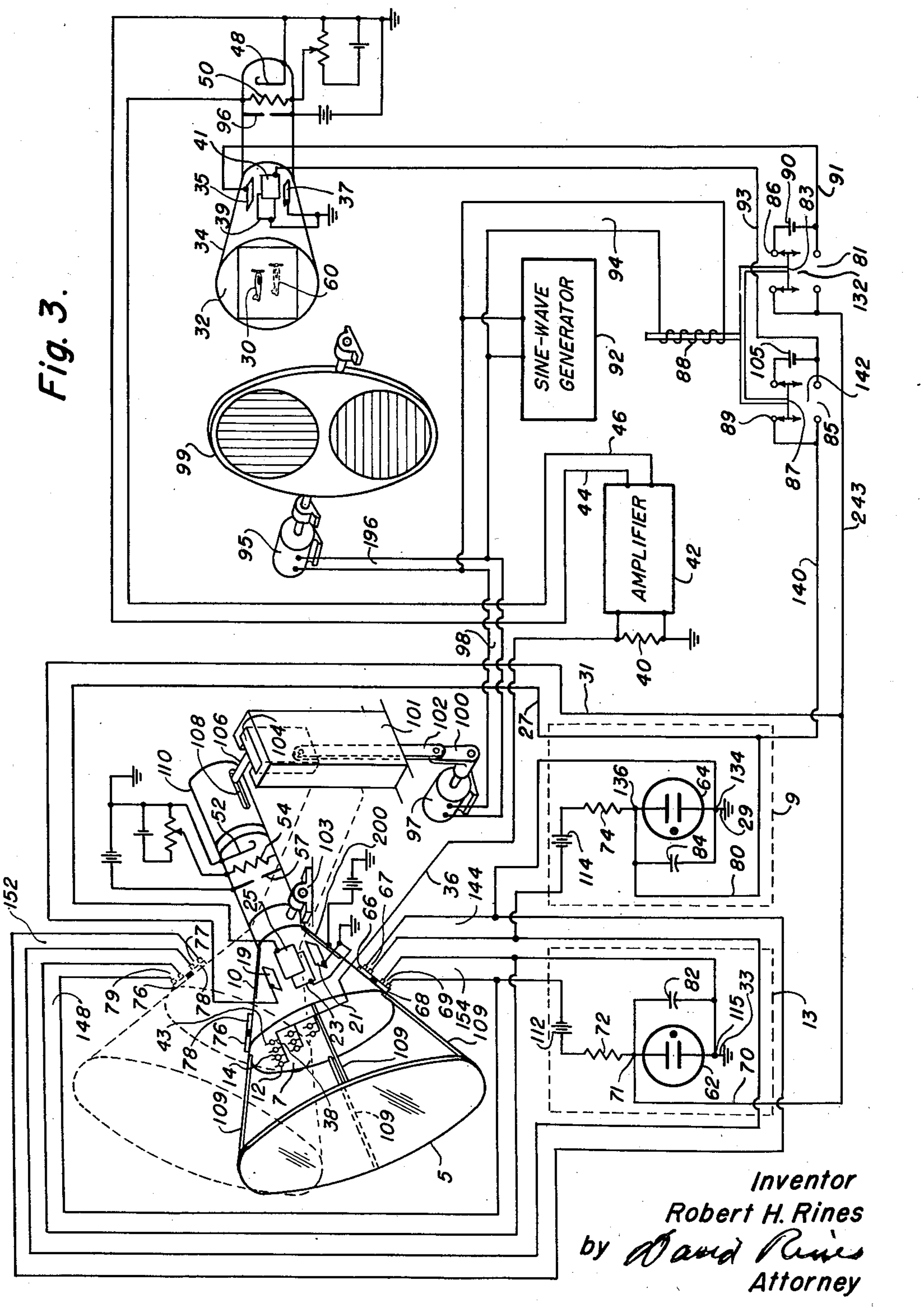
Figure 4:
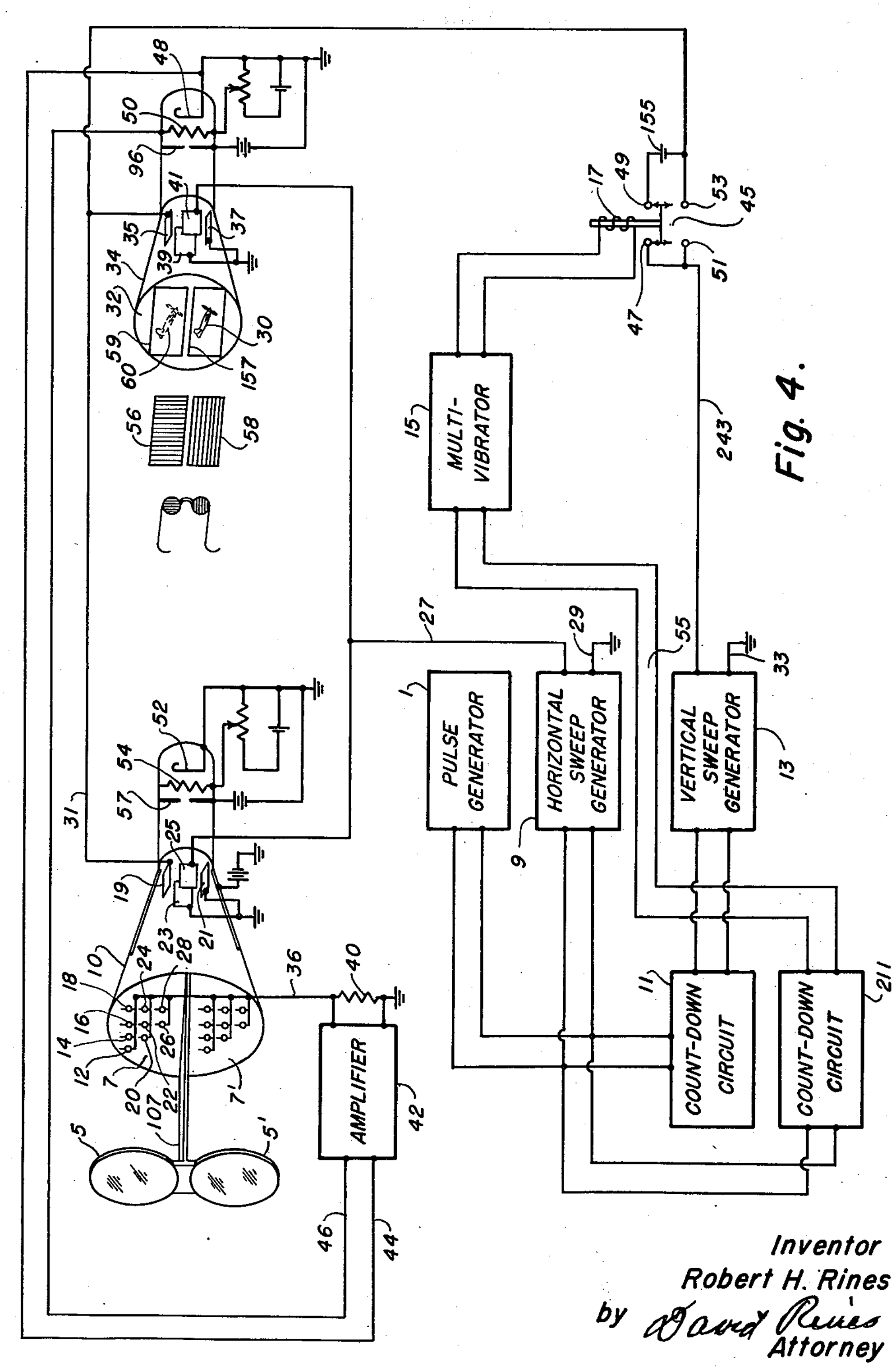
Figures 5, 6, 7, 8, 9, 10, 11:
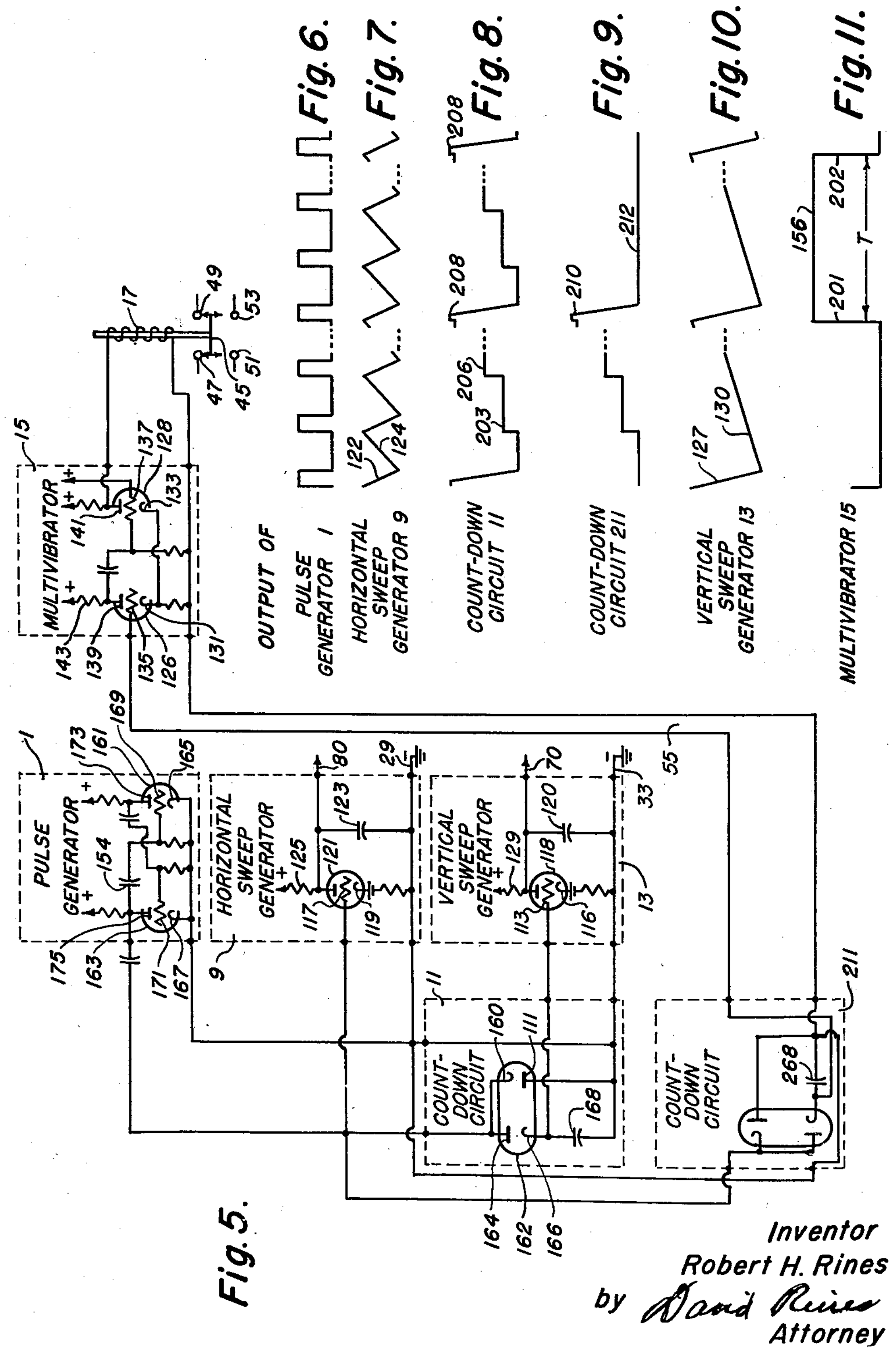
Figure 12:
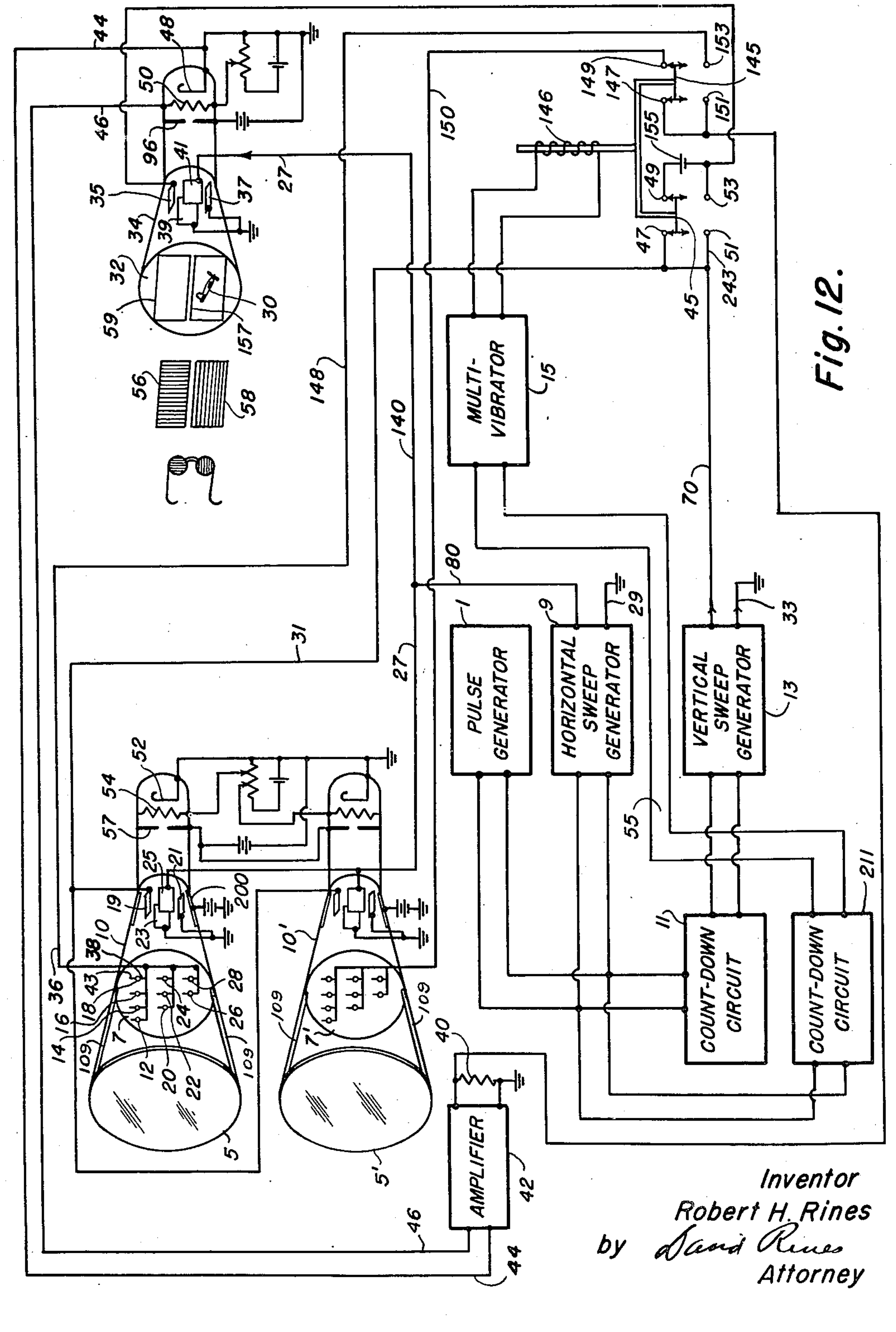

The invention will now be more fully explained in connection with the accompanying drawings, in which Fig. 1 is a diagram showing an airplane object from which radio waves are reflected and scattered to a receiving system; Fig. 2 is a diagrammatic view of circuits and apparatus of a stationary radio-wave-receiving-and-cathode-ray-display system arranged and constructed in accordance with a preferred embodiment of the present invention; Fig. 3 is a similar view of a modified movable receiving-and-display system; Fig. 4 is a similar view of a further stationary modification of the receiving-and-display system embodying a single cathode-ray-like member with two mosaics; Fig. 5 is a similar view of a circuit showing in greater detail the scanning and synchronizing elements of Fig. 4; Figs. 6, 7, 8, 9, 10 and 11 are diagrammatic views illustrating voltage wave forms obtainable with the circuits of Fig. 5; and Fig. 12 is a diagrammatic view similar to Figs. 2, 3 and 4 of still another modified receiving-and-display system, comprising two separate cathode-ray-like members, each with its own mosaic.

An electromagnetic-wave generator 4, Fig. 1, is shown exciting a dipole 2 to produce ultra-high-frequency pulsed-radio-wave or Hertzian-wave energy. A continuous-wave or any other type of modulated-wave generator may be employed, but pulsed energy, at present, has the advantages of economy and easy high-power ultra-high-frequency generation.

The waves emitted from the dipole 2 may be reflected by a reflector 3 upon a parabolic reflector 6. The parabolic reflector 6 is shown directing the waves toward an object, say, an airplane 8, from which they are reflected and scattered toward a receiving station.

The wavelength of the radio-wave or Hertzian-wave energy employed may be, say, of 30 or 15 millimeters. It should be greater than the wavelength of any type of light waves. The use of radio or Hertzian waves permits the detection of both near and distant objects 8 that may be cloaked in darkness or fog, or that are invisible with light waves for other reasons.

At the receiving station, the radio waves reflected and scattered from the object 8 may be focused by an electromagnetic dielectric lens 5, such as of pitch or polystyrene, upon a receiving mosaic, bank or array 7 comprising a plurality of normally ineffective insulated radio-wave absorbing-and-rectifying pick-up unit antenna elements. These may be constituted of small beads or globules of silicon, uranium oxide, germanium or other similar crystal pick-up-unit detecting elements. Small crystal beads or globules of uranium-oxide or other such pick-up-unit elements may, for example, be set into an insulating supporting disc in the face at the screen end of an oscilloscope-like or cathode-ray-like member 10. Any other similar mosaic of radio-wave absorbing-and-rectifying crystals may be employed, such as mosaics of silicon and metal, silicon and dielectric, and so on. The dielectric lens 5 is shown in Figs. 1 to 3 and 12 supported upon the member 12 by struts 109. It may be replaced by any other type of well known radio lens or mirror, wave-guide lens or mirror, or other directive system for focusing an image of the electromagnetic energy scattered and reflected from the object 8 upon the bank or array 7 of the pick-up antenna elements.

The pick-up elements of the bank or array 7 are shown arranged in two dimensions, along rows and columns, in the proximity of the focus of the lens 5. The first or uppermost row of the bank is illustrated in Fig. 2 as comprising the unit elements 12, 14, 16, 18, etc., shown as equally spaced horizontally. The second row from the top is shown comprising the unit elements 20, 22, 24, etc. The third or next lower row is shown comprising the unit elements 26, 28, etc.; and so on for the remaining rows of pick-up elements. Though only a small number of pick-up antenna units is shown in each row, this is merely for illustrative purposes, and in order not to confuse the disclosure. It will be understood that, in practice, a large number of units will be employed in each row.

The pick-up antenna units 18, 24, 28, etc., are arranged in the first or right-hand column. The units 16, 22, 26, etc., are disposed in the second column from the right. The elements 14, 20, etc., are disposed in the third column from the right; and so on for the remaining columns of elements. There may be as many columns as there are pick-up units in each row. Though each column is shown as comprising only a few units, this is again in order not to complicate the drawings.

The pick-up units will, of course, all receive the reflected or scattered radio waves through the lens 5 simultaneously. There will be focused on each pick-up unit a radio-frequency field strength corresponding to the scattering from a corresponding area or portion of the object 8.

The bank of silicon, uranium-oxide, germanium or other similar detecting crystals will act to absorb and rectify the energy incident on the array 7 of antenna units. Silicon and uranium-oxide detectors and similar crystals are known to absorb radio-frequency energy, and to exhibit high negative-temperature coefficients of resistance. Because of this high negative-temperature coefficient of resistance, the resistance of the uranium-oxide or other crystal beads will change with the intensity of the impinging radio-frequency energy. The pick-up elements will thus absorb different field strengths of radio energy, corresponding to the amount of energy reflected or scattered from the various parts or portions of the object 8 and converged as a radio-wave image upon the array 7 of pick-up elements by the lens 5. The resulting radio-wave-energy distribution focused on the array 7 will yield a radio-energy image or picture of the object 8, specific elemental areas or portions of which will correspond to specific elemental areas or portions of the object 8. One such radio-energy image of the object 8 will become focused on the array 7 of the oscilloscope-like member 10 when the aircraft 8 occupies the full-line position shown in Fig. 1, and another when it occupies the dotted-line position.

According to the preferred embodiment of the invention, these adjacently disposed radio-wave-energy images or pictures of the object 8 thus received by the pick-up antenna units may be converted into a pair of visible stereoscopically displaced images, pictures or likenesses 30 and 60 of the object 8 upon the fluorescent viewing screen or face 32 of a display electrostatic cathode-ray receiving or presentation oscilloscope-tube-like member 34. The images, pictures or likenesses 30 and 60 are shown by full lines and dotted lines, respectively, displaced with respect to each other, one above the other.

The invention provides means for first rendering the normal ineffective pick-up units 18, 16, 14, 12, etc., of the first row successively effective momentarily in the display circuits; for then rendering the pick-up units 24, 22, 20, etc., of the second row successively effective momentarily; for then rendering the units 28, 26, etc., of the third row successively effective momentarily; and so on, in two-dimensional order. This result may be attained by scanning the pick-up elements with an electron stream, as will hereinafter be more fully explained.

A pulse generator 1 may be supplied to trigger a horizontal-sweep generator 9 to produce a horizontal sweep voltage once corresponding to every triggering pulse from the pulse generator 1. The pulse generator 1 and the sweep generator 9 may be of the types described, for example, in Radio Engineering, by F. E. Terman, 1937 edition, pages 372 to 374.

The same pulse generator 1 may trigger also a count-down or division circuit 11 for producing a pulse output once corresponding to every so many pulse inputs from the pulse generator 1. Such a count-down or division circuit may, for example, be of the type disclosed on page 374 of the said Terman text.

The count-down circuit 11, in turn, triggers a vertical sweep generator 13 to produce a vertical sweep voltage once corresponding to every output of the count-down circuit 11, and therefore once corresponding to every so many horizontal sweep voltages produced by the horizontal sweep generator 9. A vertical sweep voltage therefore occurs once corresponding to a large number of horizontal sweeps. The process becomes repeated upon the fly-back, or the restoration of the vertical sweep voltage to its zero or initial condition.

The pulse generator 1, the horizontal sweep generator 9, the count-down circuit 11, and the vertical sweep generator 13 may also take the form of the circuits shown in Fig. 5, hereinafter described. They may also be of any other well known type.

The crystal elements 12, 14, 16, 18, etc., of the various pick-up units are respectively provided with top and bottom electrodes. The crystal 18, for example, is provided with a top antenna electrode 43 and a bottom electrode 38. The top antenna electrodes of the various crystal pick-up units may be of length resonant to the frequency of the radio waves; say, a half-wave-length.

The bottom electrodes of the crystal pick-up units are all connected to a common conducting strip 36. Similar common conducting strips are illustrated in Fig. 12 at 148 and 150. The common conducting strip 36, in turn, is connected, through a grounded load-circuit impedance 40, to a preferably linear amplifier 42. The output of the amplifier 42 is connected, by way of conductors 44 and 46, to the cathode 48 and the control-grid electrode 50, respectively, of the display or presentation cathode-ray tube 34.

The cathode-ray-oscilloscope-like member 10 is shown provided with a grounded cathode 52, a control-grid electrode 54, an anode 57 and an aquadag or other anode coating 200 on the neck of the tube 10, as is customary in present-day cathode-ray-tube construction. Electrons emitted from the cathode 52 will become enabled, in response to proper stimulation of the grid 54, to travel past the grid 54 to the anode 57. The electrons will continue to travel in a stream past the anode 57, between a pair of vertically disposed horizontal-deflector plates 23 and 25, of which the plate 23 is shown grounded, and between a pair of horizontally disposed vertical-deflector plates 19 and 21, of which the plate 21 is shown grounded, to impinge finally on the insulating supporting disc in the face at the screen end of the member 10. Focusing anodes or coils and similar other refinements (not shown), customary in cathode-ray tubes, may also be used.

The output voltage of the horizontal-sweep generator 9 is applied, by way of a grounded output lead conductor 29, to the grounded vertically disposed horizontal-deflector plate 23 and, by way of an output lead conductor 27, to the vertically disposed horizontal-deflector plate 25. The horizontal-sweep time-base voltage is thus produced between the plates 23 and 25 to cause the electron stream from the cathode 52 to become deflected horizontally for each horizontal-sweep voltage.

The vertical-sweep output voltage is fed from the vertical-sweep generator 13, by way of a grounded output lead conductor 33, to the grounded horizontally disposed vertical-deflector plate 21 and, by way of output lead conductors 70 and 31, to the horizontally disposed vertical deflector plate 19. The vertical-sweep voltage is thus applied between the horizontally disposed deflector-plates 19 and 21 to cause the electrons to become deflected vertically.

The rows of pick-up units may be positioned along the successive paths of the electron stream in order to enable the electron stream to impinge on them as the electron stream sweeps over the successive rows of crystal beads of the array 7. Horizontally disposed lines of crystal elements will thus be scanned by the electron stream.

One of the surfaces of each crystal pick-up element is thus exposed to the incoming radio waves, and the other surface is exposed, within the cathode-ray member 10, to the electron stream.

Since the vertical-sweep voltage occurs once corresponding to a large number of horizontal-sweep voltages, as previously explained, it will cause the successively produced horizontal sweeps of the electron stream to appear successively at successively lower levels along the face of the member 10. After each horizontal sweep has been completed, therefore, a successively larger voltage will be applied by the vertical-sweep generator 13 to the vertically spaced deflector plates 19 and 21, thereby causing the next horizontal sweep to occur at the next lower row of crystal beads. After the last such horizontal sweep, the voltage between the vertically spaced plates 19 and 21 will become restored to zero upon the fly-back. With the next horizontal sweep, therefore, the process of scanning will recommence at the first or top row.

The bank 7 of crystal globules may be scanned according to either of two principles or according to a combination of the same.

One principle involves measuring the variation in the resistance of each crystal pick-up unit of the bank 7 at the moment that the electron stream impinges upon it, producing an electrical response at the pick-up unit. This provides a measure of the resistance across each crystal, indicative of the intensity of the radio-frequency energy impinged upon that particular crystal and absorbed thereby directly from the radio field. Because of the high negative-temperature coefficients of resistance of the crystals, their resistance will change with the intensity of the impinging radio-frequency energy. The radio-frequency energy will also become rectified to produce direct-current potential differences across the resistance of the crystals. This results from the rectifying or detecting properties of the crystals in the above-described radio-receiving circuits traceable from the crystal antenna electrodes through the crystals to the grounded conducting strip 36. These variations of resistance and potential are representative of the radio-frequency energy impinged on the crystals by the lens 5 and impressed on these circuits. The resulting resistance and potential variations of the crystals will become manifest in corresponding circuits, as the crystals are traversed successively, during the scanning process, by the electron stream from the cathode 52. The circuits may be traced from the grounded cathode 52, through the electron stream, and through the corresponding crystal, its bottom electrode, and the grounded conducting strip 36, back to ground.

The changes occurring in this circuit, as the result of the changes in the values of the crystal resistance produced by the radio-frequency energy impinged thereon and the consequent changes in the electron-stream current, will cause corresponding changes in the input voltage to the amplifier 42. This change in input voltage is therefore indicative of the radio-frequency energy impinged on the particular crystal bead that happens to be traversed by the electron stream.

According to the second principle, advantage is taken of the direct-current voltage impressed across each crystal. This voltage is proportional to the intensity of the radio-frequency energy received by the corresponding crystal, as communicated to the said receiving circuits traceable from the corresponding top crystal electrodes, through the conductor 36, to ground. With the aid of this principle, it becomes possible to measure the change of current along the electron stream as the electron stream traverses areas of different direct-current potential. As the electron stream, during the scanning, travels across and impinges upon the successively disposed crystals, the resulting electrical responses or change in electron-stream current resulting from the different potentials across the variably resistive crystals upon which the electron stream impinges manifests itself first in the above-described crystal circuits to ground and, through these circuits, in the input circuit of the grounded preferably linear load-circuit amplifier 42.

From another point of view, as the electron stream impinges on the crystal units, secondary electrons may be emitted therefrom and collected by the anode coating 200. Owing to the direct-current charge established across the top and bottom electrodes of the respective crystals, resulting from the rectification by the corresponding crystals of the radio-frequency energy received by these respective receiving circuits, the number of secondary electrons released will be a measure of the radio-frequency voltage impinged on the respective crystals.

During the scanning of the successive rows of crystal elements of the bank 7 by the electron stream of the member 10, resulting from the operation of the horizontal and vertical-sweep generators 9 and 13, therefore, successive indications may be obtained in the amplifier 42, according to one or the other of the above-described principles, of the radio-frequency energy impinged on the respective antenna units of the array or mosaic 7. Since the magnitude of the voltage fed into the amplifier 42 from the elements 12, 14, etc., will therefore depend upon the intensity of the radio-frequency voltage received from the object 8 through the lens 5 by the respective mosaic elements, the output of the amplifier 42 will vary at successive instants in accordance with the radio-frequency energy impinged upon the successive receiving elements.

The successive energizing positive voltages thus produced in the amplifier 42 are fed by its beforementioned conductors 44 and 46 to between the cathode 48 and the control grid 50 of the display cathode-ray tube 34. As these voltages are dependent on the magnitude of the radio-frequency energy received by the respective crystal elements, the electrons of the electron stream in the cathode-ray tube 34 will become accelerated toward the control grid 50 in quantities dependent upon the intensity of the radio-frequency energy impinged on the respective crystal elements. The electron stream becomes thus modulated in intensity in response to the successive voltages from the amplifier 42. The electrons will thereafter travel past the anode 96 of the said tube 34, between a pair of horizontally disposed, vertical-deflector plates 35 and 37, of which the plate 37 is shown grounded, and between a pair of vertically disposed horizontal-deflector plates 39 and 41, of which the plate 39 is shown grounded, to impinge finally upon the fluorescent viewing screen 32.

The output voltage of the horizontal-sweep generator 9 is applied also, by way of the grounded output lead conductor 29, to the grounded vertically disposed horizontal-deflector plate 39 of the display tube 34; and, by way of the output lead conductors 80 and 140, to the vertically disposed horizontal-deflector plate 41 of the tube 34. The same horizontal-sweep voltage that is applied to the member 10, therefore, is applied synchronously to the member 34. The electron stream from the cathode 48, during its scanning, will therefore trace a horizontal line on the fluorescent screen 32 in synchronism with the scanning of a corresponding horizontally disposed line of crystal elements by the electron stream from the cathode 52 of the member 10.

The vertical-sweep generator 13, like the horizontal-sweep generator 9, is connected, not only to the tube 10, but also to the tube 34, so as synchronously to control both electron streams.

The output of the vertical-sweep generator 13 which, as previously explained, is fed by way of the conductors 31 and 33 between the vertical deflector plates 19 and 21 of the member 10, is fed also, by way of the grounded output lead conductor 33, to the horizontally disposed grounded vertical-deflector plate 37 of the tube 34; and, by way of the output lead conductors 70 and 243, a gravity-biased contactor 45, and a conductor 91, to the horizontally disposed vertical-deflector plate 35 of the tube 34. The electron stream in the member 34 is therefore controlled by the vertical-sweep generator 13 in synchronism with the corresponding vertical scanning of the crystal elements by the electron stream from the cathode 52 of the member 10.

Since successive energizing positive voltages are produced in the output of the amplifier 42, corresponding to the magnitude of the radio-frequency energy received by the successively scanned crystal elements of the array 7 of the member 10, and since these voltages are fed between the cathode 48 and the grid 50 to control the intensity of the electron stream in the tube 34, there will be produced, along a particular horizontal sweep of the electron stream in the tube 34, spots of brightness the intensity of which will depend upon the intensity of the radio-wave energy received by the corresponding crystals of the bank 7 of the member 10.

The successive portions of the radio-frequency image of the aircraft object 8 received by the successive crystal antenna units on the array 7, along the rows and columns, will thus become converted, on the oscilloscope screen 32 of the display tube 34, into successive portions of the visual likeness 30. Successive portions of this visual picture 30 will accordingly correspond to successive portions of the actual object 8.

Though the tubes 10 and 34 have been described as operating upon the electrostatic principle, it will be understood that magnetic-deflection means or a combination of magnetic and electrostatic means may equally well be employed.

The contactor 45 is provided with a switch member for bridging the one or the other pair of two pairs of contact terminals 47, 49 and 51, 53. The lower contact terminals 51 and 53 are illustrated as bridged under the influence of gravity, and the upper contact terminals 47 and 49 as bridged under the influence of a relay coil 17 or 146, Fig. 12. Electrical contact is made periodically with the one or the other pair of contact terminals in response to periodic voltages in the relay coil 17 or 146 as will be hereinafter explained.

It remains now to explain how to modify the electron stream impinging on the screen 32 in order to produce on this screen 32, not merely a simple visual image 30 of the object 8, but rather the stereoscopic pair of likenesses 30 and 60 of the original object 8.

According to the embodiment of the invention illustrated in Fig. 2, as the moving object 8 passes into the region of radio-location detection of the receiving system, the receiving array 7 of the member 10 is scanned at two successive intervals of time, thereby to present two different radio-frequency images of the object upon the array 7. These two successive time intervals may correspond to the times at which the airplane 8 occupies the full-line and the dotted-line positions of Fig. 1.

Since the airplane 8 may move at a high rate of speed, the time between these two different scannings of the array 7 should usually be very short, particularly for many ranges of the aircraft 8. The rate of repetition of the vertical sweeps may, of course, be so adjusted, for a particular type of moving object, that the array 7 shall be scanned once during approximately the time interval when the object 8 occupies the full-line position of the object 8 in Fig. 1, producing thereby, as before described, the image 30 on the oscilloscope screen 32; and so that the array 7 shall be scanned once again at a later instant, during approximately the time interval when the object 8 occupies the dotted-line position of Fig. 1, thereby to produce the other image 60 on the screen 32, displaced with respect to the image 30.

To the attainment of this end, a count-down circuit 211, identical and operating synchronously with the count-down circuit 11 for triggering the vertical sweep generator 13, may, by way of conductors 55, trigger an unbalanced multivibrator or other circuit 15 of the type illustrated in Fig. 5, hereinafter described, or of any other well known type.

The time constants of the multivibrator 15 should be so adjusted as to correspond, at the time of its triggering by the count-down circuit 211, to a particular period about equal to the period between successive count-down-circuit pulses, and, therefore, equal to the period between successive vertical sweeps. The output of the multivibrator 15 will then have alternately positive and negative voltage pulses during successive complete vertical scans.

The connections are such that the relay coil 17 or 146 is caused to actuate the switch member of the contactor 45 into engagement with the contact terminals 47 and 49 when the output-voltage pulse of the multivibrator 15 is positive. The output of the vertical-sweep generator 13 becomes thereupon connected, by way of the lead conductor 243, and through a series-connected biasing battery 155, to the vertical deflector plate 35 of the display tube 34. A biasing battery 155 is so adjustably connected between the contact members 49 and 53 that the first horizontal sweep of the tube 34 shall occur at a particular level on the screen 32, shown at 157. Under the influence of the vertical sweep, horizontal sweeps will then occur at successively lower levels during the scanning of the array 7, as previously described. The image or likeness 30, as already stated, will therefore correspond to the object 8 when occupying the full-line position of Fig. 1.

During the next vertical-sweep scanning operation of the array 7, however, the object 8 will have reached the dotted-line position of Fig. 1. The output-voltage pulse of the multivibrator 15 being now negative, the switch member of the relay contactor 45 will drop, under the action of gravity, to engage the contact terminals 51 and 53, thus by-passing the biasing battery 155. The first horizontal sweep of this next scan will therefore occur on the screen 32 at a much higher level, shown at 59. The image corresponding to the dotted-line position of the object 8 in Fig. 1 will thus be reproduced as the dotted-line image 60 on the screen 32, stereoscopically displaced above the image 30.

The vertical-sweep generator 13, through the contactor 45, thus alternately connects, first, with the contact members 47 and 49, and then, with the contact members 51 and 53, in response to the alternating positive and negative output voltages of the unbalanced multivibrator or other circuit 15. The biasing battery becomes thus connected to and disconnected from the vertical deflection plates 35, 37 of the display cathode-ray tube 34, thereby causing the vertical scan of the electron stream to cover adjacently disposed separated areas below the levels 157 and 59, respectively, on the fluorescent screen 32.

A color filter or a polarizing member 56 may be positioned in front of the image 60, and a differently colored filter or a complementarily polarized member 58 in front of the image 30. A camera having two lenses 61 and 63, respectively provided with filters or polarizing members corresponding to the respective filters or polarizing members 56 and 58, may be employed to photograph upon adjacently disposed separated portions of a film 65 the stereoscopic pair of images 60 and 30 produced upon the screen 32. Successive photographic exposures will obviously provide recordings of successive pairs of slightly displaced stereoscopic views.

The successively produced stereoscopic pairs 60 and 30 may also be observed visually, as in motion pictures, by an observer with eyeglasses the lenses of which are respectively colored or polarized corresponding to the members 56 and 58. To indicate this, a pair of spectacles is illustrated in front of the members 56 and 58 in Figs. 4 and 12. If, for example, the filters 56 and 58 are respectively colored red and blue, the lenses may be correspondingly colored.

The operation of the apparatus illustrated in connection with Fig. 2 is operable to display a three-dimensional image of an object 8 that is moving at a suitable speed. According to the modified receiving-and-display circuit illustrated in Fig. 3, however, the object 8 to be detected and viewed stereoscopically may be either stationary or moving. The pictures for use as a stereoscopic pair may be reproduced by receiving radio waves from the object 8, for example, from two slightly displaced positions of the radio-receiver 5—7. The lens 5 should, of course, subtend cones of radio rays corresponding to the cones of light rays that would be received by the two human eyes if the object were visible.

The member 10, with the lens 5 and the struts 109 supported thereby, is shown in Fig. 3 vibratory or oscillatable about a pivot 103 between full-line and the dotted-line positions. The array 7 is caused to be scanned when the member 10 occupies each of the extreme positions of its vibrating, oscillatory or shunting movement. A pair of radio-wave images of a stationary object is thus produced at the adjacently disposed regions occupied by the device 10—7 at the extreme positions of vibration. If the rate of oscillation is high enough, two adjacently disposed views of a moving object may also be obtained.

The oscillatory movement of the member 10 is shown diagrammatically as effected by reciprocating a slide 104 in a vertically disposed guide 101 through the medium of a link 102 connected to a crank 100 driven by a motor 97. A pin 106 integral with the slide 104 engages in a longitudinally disposed slot 108 provided in an extension cap 110 of the member 10.

When the member 10 occupies the full-line position of Fig. 3, two insulated contact members 66 and 68 respectively short-circuit connectors 67 and 69 that are respectively connected by conductors 144 and 154 to the horizontal sweep generator 9 and the vertical sweep generator 13. When it occupies the dotted-line position, two insulated contact members 76 and 78 similarly short-circuit connectors 79 and 77 that are respectively connected by conductors 148 and 152, in parallel with the connectors 69 and 67, to the vertical sweep generator 13 and the horizontal sweep generator 9.

The short-circuiting of the connector 69 establishes a circuit for charging a grounded charging condenser 82 through a resistor 72 and a battery 112 of the vertical sweep generator 13; and also to discharge the condenser 82 through a gas-discharge tube 62 connected in parallel thereto when the charging voltage exceeds the breakdown voltage of the tube 62. The connections may be traced from one side of a battery 112, through the connection 69, short-circuited by the contact member 68 or 76, to one of the common terminals or junctions of the condenser 82 and the gas tube 62, shown at 115; then through the condenser 82 and the gas tube 62, in parallel, to the other common terminal or junction 71; and through the resistor 72, to the other side of the battery 112.

The charge and discharge of the condenser 82 through the gas tube 62, at a time when the member 10 occupies either its extreme full-line or dotted-line position, provides a vertical-sweep voltage that is supplied simultaneously to both the vertical deflector plates 19 and 21 of the member 10 and the vertical deflector plates 35 and 37 of the oscilloscope 34.

The connections to the vertical deflector plates 19 and 21 may be traced from the common terminal or junction 71 of the parallel-connected condenser 82 and gas tube 62, by way of conductors 70 and 31, to the vertical deflector plate 19; and from the vertical deflector plate 21, by way of the illustrated grounds and the conductor 33 to the common terminal 115 of the parallel-connected condenser 82 and gas tube 62. The connections to the vertical deflector plates 35 and 37 may similarly be traced from the common terminal or junction 71, by way of conductors 70 and 243, to contact members 81 or 86 of a relay 132 provided with a bridging switch contact member 83. When the contact member 83 bridges the terminal members 86, as illustrated, the circuit continues through a biasing battery 90, corresponding to the biasing battery 155, and, by way of the conductor 91, to the vertical deflector plate 35 of the display tube 34. The circuit continues to the terminal or junction 115 through the illustrated grounds and the conductor 33.

The short-circuiting of the connecter 67 by the contact member 66 or 78 similarly establishes a circuit for similarly charging a similarly grounded charging condenser 84 through a resistor 74 and a battery 114, and similarly discharging the condenser 84 through a similar gas tube 64 connected in parallel thereto when the charging voltage exceeds the breakdown voltage of the tube 64. The connections may be traced from one side of the battery 114, by way of the conductors 144, through the connection 67 when short-circuited by the contact member 66, to one of the common terminals or junctions of the condenser 84 and the gas-discharge tube 64, shown at 134; then through the condenser 84 and the gas tube 64, in parallel, to the other common terminal or junction 136; and through the resistor 74, to the other side of the battery 114.

The charging condenser 84 and the discharge tube 64, at a time when the member 10 occupies its extreme full-line or dotted-line position, provides a horizontal-sweep voltage that is supplied simultaneously to both the horizontal-deflector plates 23 and 25 of the member 10 and the horizontal-deflector plates 39 and 41 of the oscilloscope 34.

The connections to the member 10 may be traced from the common terminal or junction 136 of the parallel-connected condenser 84 and gas tube 64 by way of conductors 80 and 27, to the deflector plate 25; and from the deflector plate 23, by way of the illustrated grounds and the conductor 29, to the common terminal or junction 134. The connections to the oscilloscope 34 may be traced from the common terminal or junction 136, by way of conductors 80 and 140, to the contact members 85 or 89 of a relay 142 provided with a bridging switch contact member 87. When the contact member 87 bridges the contact members 89, as illustrated, the circuit continues through a biasing battery 105, corresponding to the biasing batteries 90 and 155, and, by way of a conductor 93, to the horizontal deflector plate 41 of the oscilloscope 34. The circuit is completed from the horizontal deflector plate 39 to the common terminal or junction 134, through the illustrated grounds and the conductor 29.

The time constants of the condenser 84 and of the resistor 74, and the breakdown voltage of the gas tube 64, are so adjusted that there shall be a large number of charges and discharges of the condenser 84 during the period corresponding to a single charging of the condenser 82 through the resistor 72 and its discharge through the tube 62. A large number of horizontal sweep voltages is thus produced between the horizontal deflector plates 19 and 21 of the member 10, corresponding to each vertical sweep voltage from the condenser 82 that is applied to the vertical deflector plates 23 and 25 of the member 10. The horizontal-sweep voltages in the tube 34 are also thus synchronised with the horizontal scanning of the array 7 in the member 10.

The image or likeness 30 is therefore produced on the screen 32 of the tube 34 when the array 7 is scanned in the full-line position of the member 10, much as described in connection with the system illustrated in Fig. 2; and the image 60, shown in Fig. 3, is similarly produced when the array 7 is scanned in the dotted-line position of the member 10.

A sine-wave oscillator generator 92 energizes the field-magnet winding of the motor 97 by way of conductors 98. By way of conductors 196, the oscillator 92 also energizes the field-magnet winding of a motor 95 for rotating a filter or polarizer disc 99, oppositely disposed halves of which are provided with differently-colored filters or different polarizing devices. The oscillator 92 also energizes a common relay coil 88 for the relays 132 and 142, by way of conductors 94.

When, therefore, the motor 97 actuates the member 10 to its extreme full-line position, in response to, say, the positive half-cycle oscillation of the sine wave from the sine-wave oscillator 92, the motor 95 will similarly actuate the corresponding color filter or polarizer in front of the screen 32, and the relay 88 will be energized so that contactors 83 and 87 shall connect respectively with their upper relay terminals 86 and 89. Since, as previously described, the biasing batteries 90 and 105 are then in circuit with the respective output circuits from the vertical-sweep-generator condenser 82 and the horizontal-sweep-generator condenser 84, the first horizontal sweep will start at a predetermined vertical level on the screen 32 of the tube 34, and at a predetermined horizontal position on the screen 32. The image 30 will thus be produced on a predetermined portion of the screen 32.

During the negative half-cycle part of the sine-wave voltage from the oscillator 92, the motor 97 will have actuated the pin 106 to its lowermost position, so as to actuate the member 10 to its extreme dotted-line position. At this instant, the motor 95 will have actuated the other color filter or polarizer of the disc 99 in front of the screen 32. At this time, too, the voltage across the relay coil 88 will be of opposite polarity, with the result that the contactors 87 and 83 will eliminate the respective biasing batteries 105 and 90 from the sweep-circuit connection to the tube 34. The likeness 60 of the object that will be produced on the screen 32 at the time when the member 10 occupies its dotted-line position, therefore, will be displaced slightly vertically and horizontally from the position of the image 30, produced when the member 10 occupies its full-line position.

The amount of displacement of the two images 30 and 60 thus successively produced upon the screen 32 may be controlled by suitably adjusting the voltage of the direct-current biasing batteries 105 and 90. The adjustment should be consistent with the displacement normally obtained with the display of two stereoscopic pictures on one sheet.

In order that the successive portions of the successive images, corresponding to the images received by adjacently disposed cones of light impinging on the human eyes, may appear as continuous, the frequency of the oscillations of the oscillator 92 may be sixteen per second or more.

The same result as that attained with the aid of the apparatus illustrated in Fig. 3 may be obtained also without oscillating the member 10. In the system of Fig. 4, for example, two adjacently disposed electromagnetic lenses 5 and 5' may be employed to focus upon adjacently disposed regions corresponding adjacently disposed radio-wave distributions scattered or reflected from the object 8 upon two mosaics 7 and 7′ of radio-receiving elements, shown mounted on the same face of the cathode-ray tube-like member 10. These should correspond substantially to the cones of rays of light that the two human eyes would subtend when viewing the object if the object were visible. The electromagnetic lenses 5 and 5′ are shown mounted on a member 107, preferably of shielding material, such as metal, to prevent the adjacently disposed radio-wave images respectively formed by the lenses 5 and 5′ from interfering with each other, and to confine each radio-wave image to its particular mosaic.

The same types of pulse-generating and sweep circuits discussed in connection with the system of Fig. 2 may be used also in the system of Fig. 4. The electron stream of the member 10 is therefore caused to scan first the array 7 and then the array 7′, in response to the application and removal of the positioning voltage of the biasing battery 155 when connected into and out of circuit by the energization of the relay coil 17 and the operation of gravity upon the contactor 45. The image or likeness 60 on the upper portion of the screen 32 of the cathode-ray tube 34 will therefore correspond to the scanning of the radio-wave image on the array 7 of the member 10, and the image or likeness 30 produced on the lower portion of the screen 32 will correspond to the radio-wave image scanned on the array 7′ of the member 10. The alternate scanning of the upper and lower arrays 7 and 7′ of the member 10 is thus effected in synchronism with the displays on the upper and lower portions of the screen 32 of the display cathode-ray tube 34.

An observer viewing the filters 56 and 58, similar to those illustrated in Fig. 2, will thus see with his respective eyes the respective images 60 and 30 corresponding to the radio-wave images focused by the lenses 5 and 5′. Since these, as previously explained, correspond to adjacent views of the object, the observer will obtain a continuous stereoscopic view of the object.

Not only may the object 8 be stationary, but, if the frequency of the vertical sweep generator is high enough, it may also be movable; for the alternate scans of the radio-wave images on the arrays 7 and 7′ will then occur rapidly enough so that the object 8 shall not have moved substantially during the period of the scanning. The system 5—7—5′—7′, moreover, may, if desired, be rotated, oscillated or moved in azimuth and elevation in a manner similar to that discussed in connection with the embodiment of Fig. 3, or in any other desired manner, well known in the radio-location art.

The pulse generator 1 is shown in Fig. 5 comprising a conventional multivibrator type of square-wave generator having two sections of a double triode 161 and 163, provided with respective cathodes 165 and 167, respective control grids 169 and 171, and respective anodes or plates 173 and 175. The plate 175 of the triode section 163 is resistance capacitance coupled between the grid 169 and the cathode 165 of the triode section 161. The coupling capacitor is shown at 154. The plate 173 of the triode section 161 is similarly resistance-capacitance coupled between the control electrode 171 and the cathode 167 of the triode section 163. When one section of the tube, say, the section 163, is conducting, therefore, the negative voltage at its plate 175 is coupled to the control electrode 169 of the other section 161. The section 161 is thus maintained cut off until no further change takes place through the section 163. The coupling condenser 154 between the plate 175 and the grid 169 then charges positively to permit the section 161 to conduct. The voltage of the plate 173 of the section 161 thereupon drops to cut off the section 163 through the capacitance-resistance coupling thereto. Similar considerations apply when the section 161 of the tube is conducting.

A square-wave output, illustrated in Fig. 6, is thus obtained, having periods of positive and negative pulses, depending upon the setting of the respective capacitance-resistance coupling circuits.

This square-wave output of Fig. 6 is fed between the control electrode 117 and the cathode 119 of the vacuum tube 121 of the horizontal-sweep generator 9. The cathode 119 is shown positively biased, so as normally to cut off the tube 121. A horizontal-sweep discharge condenser 123 is charged from a B battery, not shown, through a plateload charging resistor 125. The positive pulses from the pulse generator 1 will reconnect the tube 121 into circuit, discharging the sweep condenser 123 through the tube 121, as represented at 122 in Fig. 7. Upon the positive pulse of the generator 1 swinging negative, the tube 121 becomes cut off again, and the condenser 123 recharges through the plate-load resistor 125, producing the charging sweep voltage represented at 124 in Fig. 7. The resulting sawtooth sweep voltage represented at 122 and 124 becomes impressed upon the output conductors 80 and 29, for application, as before described, to the horizontal-deflector plates 23 and 25 of the member 10 and 39 and 41 of the oscilloscope 34, thereby to cause the electron streams periodically to scan horizontally and then rapidly to fly-back.

The output voltage of the pulse generator 1 also triggers the count-down circuit 11, shown comprising the normally non-conducting double-diode step-charger 162, comprising an anode 164 and a cathode 166, and an anode 111 and a cathode 160. The positive pulse of the output voltage of the pulse generator 1 renders the anode 164 positive with respect to the cathode 166. The double-diode 162 thereupon becomes conducting in one direction to charge a condenser 168 to a particular voltage level, or step, represented at 203, in Fig. 8. When the negative pulse from the pulse generator 1 occurs, the double-diode 162 ceases to conduct between the cathode 166 and the anode 164. The condenser 168 remains charged, however, because this negative pulse is by-passed between the cathode 160 and the anode 111 to the ground 33. The next positive pulse from the pulse generator 1 will charge the condenser 168 a further increment, as represented by the further step 206; and subsequent pulses will similarly charge the condenser 168 by further similar voltage increments.

The output of the condenser 168 is fed between the control electrode 113 and the cathode 116 of a vacuum tube 118 of the vertical-sweep generator 13. The cathode 116 is shown positively biased, so as normally to cut off the tube 118. A vertical-sweep discharge condenser 120 is charged from a B-battery, not shown, through a plate-load charging resistor 129. Only when the voltage accumulated by several pulses from the pulse generator 1 upon the condenser 168 has risen to a value represented at 208, Fig. 8, sufficient to overcome the bias of the cathode 166, therefore, will the vertical-sweep generator 13 conduct. So conducting, it will discharge the vertical-sweep-generator condenser 120, as represented at 127 in Fig. 10. The condenser 120 will then proceed to recharge through the plate load 129, as represented at 130, in Fig. 10, until sufficient pulses from the pulse generator 1 shall have again charged the condenser 168 to a sufficient voltage to cause the sweep-generator tube 118 to conduct again, and thus again to discharge the sweep condenser 120. The double-diode step-charger 162 of the count-down circuit 11 thus acts as a division or count-down circuit, triggering the tube 118 of the vertical-sweep generator 13 only once corresponding to every so many outputs of the pulse generator 1, and therefore corresponding once to every so many horizontal sweeps 124 of the horizontal-sweep generator 9, depending upon the setting of the bias on the cathode 116 of the vertical-sweep tube 118.

The time constants of the horizontal-sweep condenser 123 and its charging resistor 125 determine the slope of the sweep 124 shown in Fig. 7, and the time constants of the vertical-sweep condenser 120 and its charging resistor 129 determine the slope of the vertical sweep 130 shown in Fig. 10, according to well-known television techniques.

The output of the vertical-sweep generator, as represented in Fig. 10, is fed by conductors 70 and 33 between the vertical-deflection plates 19 and 21 of the member 10 and the vertical-deflection plates 35 and 37 of the oscilloscope 34, as before described, to cause the horizontal sweeps of the electron streams to appear at successively lower levels on the array 7 and the screen 32 of the respective members 10 and 34.

The count-down circuit 211 may be identical with the count-down circuit 11. It is shown provided with a step-charging double-diode which may also be triggered by the pulse generator 1, thus to count down the triggering pulses synchronously with the count-down circuit 11. The output of the count-down circuit 211 is therefore shown fed, as before stated, by the conductors 55 to the multivibrator 15. This multivibrator 15 is illustrated as a double-triode having sections 126 and 128, provided respectively with cathodes 131 and 133, control electrodes 135 and 137, and plates or anodes 139 and 141. One of the plate-load resistors is shown at 143. The control electrode 137 is shown positively biased to permit the section 128 normally to conduct. Since the cathodes 131 and 133 are shown connected together, the cathode 131 becomes biased to a value that is adjusted by the value of the cathode load to correspond to the bias on the cathode 116 of the vertical-sweep tube 118, represented at 210 in Fig. 9. The cathode 131 could, of course, be biased in any other well known manner.

When the positive voltage upon the count-down condenser 268 of the count-down circuit 211 charges to the bias value represented at 210 in Fig. 9, the section 126 of the multivibrator 15 bursts into conduction, its plate 139 dropping in voltage, thereby dropping the voltage of the grid 137 of the section 128, by way of the condenser-resistance-coupling circuit shown connected thereto, and cutting off the section 128. At this time, the voltage at the anode or plate 141 of the section 128 will rise, as shown at 201 in Fig. 11. While the section 126 is conducting, the step-charging condenser 268 of the count-down circuit 211 cannot charge, as is indicated at 212 in Fig. 9. The section 128 will remain cut off until no further change takes place in the section 126 and the capacitance-resistance coupling has charged positively enough, through the plate load 143, to cause the section 128 again to conduct, and the voltage at the plate 141, therefore, to drop, as indicated at 202 in Fig. 11.

The time constants of this condenser-resistance coupling circuit are such as to require a period of time about equal to the period between successive step-charging voltage sequences of the count-down circuits 11 and 211. Once the section 126 becomes conducting, therefore, it will continue to conduct until its plate-coupling condenser has charged positively enough to cause the section 128 to start to conduct. The voltage at the cathode 133 will then rise, increasing the voltage on the cathode 131 once more to bias off the section 126.

A positive and negative output thus results at the plate 141 of the section 128. The positive output is represented at 156, in Fig. 11, having a period T approximately equal to the period of the vertical sweep illustrated in Fig. 10. The relay coil 17 becomes thus energized with a positive voltage for holding the switch member of the contactor 45 in contact with the upper contact terminals 47 and 49 during one vertical scan 130, as represented in Fig. 10. During the next successive vertical scan, and the corresponding vertical sweep, since the output voltage of the section 128 has become negative, gravity will actuate the switch member of the contactor 45 down into contact with the lower contact terminals 51 and 53. The biasing battery 155 will therefore be connected into and out of circuit during alternate vertical scans, as previously described.

According to the modification illustrated in Fig. 12, instead of a single member 10, provided with two mosaics 7 and 7′, as illustrated in Fig. 4, two identical separate members 10 and 10′ may be employed, respectively provided with electromagnetic mirrors or lenses 5 and 5′ for focusing adjacently disposed images of the object 8 upon adjacently disposed regions at which are located the respective arrays or mosaics 7 and 7′, and connected in parallel to the sweep circuits 9 and 13. The circuits and their operation are identical with those of Fig. 4, with a few exceptions. According to this modification, the output of the elements of the mosaic 7 is not fed directly, by way of the lead conductor 148, and the output of the elements of the member 7′ is not fed directly, by way of the lead conductor 150, across the load impedance 40 in the input electric circuit of the amplifier 42. The output lead 148 from the array 7 is fed, instead, to a contact member 153, and the output lead 150 from the array 7′ is fed similarly to a contact member 149. A contactor 145, the switch member of which operates in synchronism with the switch member of the contactor 45 under the control of the relay coil 146, alternately connects first, the output of the array 7′, by way of the conductor 150, through the contact member 149 and a contact member 147, and then the output of the array 7, by way of the conductor 148 and the terminal 153 and a contact member 151, to the impedance 40 in the input circuit of the amplifier 42. During alternate scans of the members 7 and 7′, therefore, the signals resulting from the scan of the array 7, and then from the scan of the array 7′, will successively be transmitted to the amplifier 42, to be reproduced on the successive corresponding upper and lower regions of the screen 32 of the display cathode-ray tube 34.

Further modifications will occur to those skilled in the art, and all such are considered to be within the spirit and the scope of the invention, as defined in the appended claims.

What is claimed is:

1. An electric system having, in combination, means for receiving from an object adjacently disposed radio-wave distributions of wavelength of the order of millimeters and above, and means for producing a stereoscopic pair of likenesses corresponding to the radio-wave energy of the radio-wave-distributions received by the radio-receiving means.

2. An electric system having, in combination, means for focusing radio waves from an object upon a pair of adjacently disposed regions, antenna means for receiving the radio waves focused upon the said regions, and means controlled in accordance with the radio waves received by the antenna means for producing a stereoscopic pair of likenesses of the object.

3. An electric system having, in combination, means for focusing radio waves from an object upon a pair of adjacently disposed regions, radio-receiving means comprising crystal-detector means for receiving and rectifying the radio waves focused upon the said regions, and means controlled in accordance with the rectified radio waves for producing a pair of stereoscopic likenesses of the object.

4. An electric system having, in combination, means for focusing radio waves from an object upon a pair of adjacently disposed regions, a plurality of radio-receiving elements for receiving the radio waves focused upon the said regions, each element comprising means the resistance of which varies in accordance with the intensity of the radio waves received thereby, means for indicating the resistance variations of the elements, and means controlled in accordance with the said resistance variations for producing a stereoscopic pair of likenesses of the object.

5. An electric system having, in combination, means for transmitting radio waves toward an object, means for focusing the transmitted radio waves after reflection or scattering from the object upon a pair of adjacently disposed regions, means for receiving the radio waves focused upon the said regions, and means controlled in accordance with the radio waves received by the receiving means for producing a stereoscopic pair of likenesses of the object.

6. An electric system having, in combination, means for focusing radio waves from an object upon a pair of adjacently disposed regions, a plurality of antenna elements for receiving the radio waves focused upon the said regions, and means controlled in accordance with the radio waves received by the antenna elements for producing a pair of stereoscopic likenesses of the object.

7. An electric system having, in combination, means for focusing radio waves from an object upon a pair of adjacently disposed regions, means for receiving and scanning the radio waves focused upon the said regions, and means controlled in accordance with the scanned radio waves for producing a stereoscopic pair of likenesses of the object.

8. An electric system having, in combination, means for focusing radio waves from an object upon a pair of adjacently disposed regions, means for receiving the radio waves focused upon the said regions, means for scanning the receiving means to effect the scanning of the received radio waves, and means controlled in accordance with the scanned radio waves for producing a stereoscopic pair of likenesses of the object.

9. An electric system having, in combination, means for focusing radio waves from an object upon a pair of adjacently disposed regions, an array of antenna elements for receiving the radio waves focused upon the said regions, means for scanning the elements to effect the scanning of the received radio waves, and means controlled in accordance with the scanned radio waves for producing a stereoscopic pair of likenesses of the object.

10. An electric system having, in combination, means for focusing radio waves from an object upon a pair of adjacently disposed regions, a plurality of radio-receiving elements comprising crystal-detector means for receiving and rectifying the radio waves focused upon the said regions, means for scanning the elements to effect the scanning of the received radio waves, and means controlled in accordance with the scanned radio waves for producing a stereoscopic pair of likenesses of the object.

11. An electric system having, in combination, means for focusing radio waves from an object upon a pair of adjacently disposed regions, a plurality of radio-receiving elements comprising crystal-detector means for receiving and rectifying the radio waves focused upon the said regions, means comprising an electron stream for scanning the elements to effect the scanning of the received radio waves, and means controlled in accordance with the scanned radio waves for producing a stereoscopic pair of likenesses of the object.

12. An electric system having, in combination, means for focusing radio waves from an object upon a pair of adjacently disposed regions, a two-dimensional array of elements for receiving the radio waves focused upon the said regions, means for scanning the elements in two-dimensional order to effect the two-dimensional scanning of the received radio waves, and means controlled in accordance with the scanned radio waves for producing a stereoscopic pair of likenesses of the object.

13. An electric system having, in combination, means for focusing radio waves from an object upon a pair of adjacently disposed regions, a plurality of antenna elements arranged in rows and columns for receiving the radio waves focused upon the said regions, means for scanning the elements along the rows and columns to effect the scanning of the radio waves received along the rows and columns, and means controlled in accordance with the scanned radio waves for producing a stereoscopic pair of likenesses of the object.

14. An electric system having, in combination, means for receiving from an object adjacently disposed radio-wave distributions of wavelength of the order of millimeters and above, cathode-ray-tube means having screen means and electron-stream-producing means for impinging electrons on the screen means, and means controlled in accordance with the radio waves received by the receiving means for controlling the electron-stream-producing means to produce a stereoscopic pair of likenesses of the object on the screen means.

15. An electric system having, in combination, means for focusing radio waves from an object upon a pair of adjacently disposed regions, antenna means for receiving the radio waves focused upon the said regions, cathode-ray-tube means having screen means and electron-stream-producing means for impinging electrons on the screen means, and means controlled in accordance with the radio waves received by the antenna means for controlling the electron-stream-producing means to produce a stereoscopic pair of likenesses of the object on the screen means.

16. An electric system having, in combination, means for focusing radio waves from an object upon a pair of adjacently disposed regions, antenna means for receiving the radio waves focused upon the said regions, means for scanning the antenna means to effect the scanning of the received radio waves, cathode-ray-tube means having screen means and electron-stream-producing-and-deflecting means for scanning the screen means, means for synchronizing the scanning operation of the electron stream with the scanning of the antenna means, and means controlled in accordance with the scanned radio waves for controlling the intensity of the electrons of the electron-stream-producing-and-deflecting means to produce a stereoscopic pair of likenesses of the object on the screen means.

17. An electric system having, in combination, means for focusing radio waves from an object upon a pair of adjacently disposed regions, a plurality of antenna elements for receiving the radio waves focused upon the said regions, means for scanning the antenna elements to effect the scanning of the received radio waves, cathode-ray-tube means having screen means and electron-stream-producing-and-deflecting means for scanning the screen means, means for synchronizing the scanning operation of the electron stream with the scanning of the antenna elements, and means controlled in accordance with the scanned radio waves for controlling the intensity of the electrons of the electron-stream-producing-and-deflecting means to produce a stereoscopic pair of likenesses of the object on the screen means.

18. An electric system having, in combination, means for focusing radio waves from an object upon a pair of adjacently disposed regions, antenna means for receiving the radio waves focused upon the said regions, a load circuit, means for scanning the antenna means to effect the scanning of the received radio waves, means controlled in accordance with the scanning of the antenna means for energizing the load circuit, cathode-ray-tube means having screen means and electron-stream-producing-and-deflecting means for scanning the screen means, and means connected with the load circuit and controlled in accordance with the scanned radio waves for controlling the intensity of the electrons of the electron-stream-producing-and-deflecting means to produce a stereoscopic pair of likenesses of the object on the screen means.

19. An electric system having, in combination, means for focusing radio waves from an object upon a pair of adjacently disposed regions, cathode-ray-tube means having radio-receiving means for receiving the radio waves focused upon the said regions and electron-stream-producing-and-deflecting means for scanning the radio-receiving means to effect the scanning of the received radio waves, and means controlled in accordance with the scanned radio waves for producing a stereoscopic pair of likenesses of the object.

20. An electric system having, in combination, means for focusing radio waves from an object upon a pair of adjacently disposed regions, a plurality of radio-receiving elements for receiving the radio waves focused upon the said regions, electron-stream-producing means for impinging electrons on the radio-receiving elements to produce electrical responses at the respective radio-receiving elements corresponding to the intensity of the radio waves received by the respective elements, and means controlled in accordance with the electrical responses for producing a stereoscopic pair of likenesses of the object.

21. An electric system having, in combination, means for focusing radio waves upon a pair of adjacently disposed regions, and cathode-ray-tube means having radio-receiving means for receiving the radio waves focused upon the said regions, and electron - stream - producing-and-deflecting means for scanning the radio-receiving means.

22. An electric system having, in combination, means for focusing radio waves upon a pair of adjacently disposed regions, cathode-ray-tube means having uranium-oxide radio-receiving means for receiving the radio waves focused upon the said regions, and electron-stream-producing-and-deflecting means for scanning the radio-receiving means.

23. An electric system having, in combination, means for focusing radio waves upon a pair of adjacently disposed regions, cathode-ray-tube means having silicon radio-receiving means for receiving the radio waves focused upon the said regions, and electron-stream-producing-and-deflecting means for scanning the radio-receiving means.

24. An electric system having, in combination, means for focusing radio waves upon a pair of adjacently disposed regions, cathode-ray-tube means having germanium radio-receiving means for receiving the radio waves focused upon the said regions, and electron-stream producing-and-deflecting means for scanning the radio-receiving means.

25. An electric system having, in combination, means for focusing radio waves from an object upon a pair of adjacently disposed regions, cathode-ray-tube means having radio-receiving elements for receiving the radio waves focused upon the said regions and electron-stream-producing-and-deflecting means for scanning the radio-receiving means to effect the scanning of the received radio waves, presentation cathode-ray-tube means having screen means and electron-stream-producing-and-deflecting means for scanning the screen means, means for synchronizing the scanning operation of the electron streams of the two said cathode-ray-tube means, and means controlled in accordance with the scanned radio waves for controlling the intensity of the electrons of the presentation cathode-ray-tube electron-stream-producing-and-deflecting means to produce on the screen means a stereoscopic pair of likenesses of the object.

26. An electric system having, in combination, means for transmitting radio waves toward an object, means for focusing the transmitted radio waves after reflection or scattering from the object upon a pair of adjacently disposed regions, cathode-ray-tube means having radio-receiving elements for receiving the radio waves focused at the said regions and electron-stream-producing-and-deflecting means for scanning the radio-receiving means to effect the scanning of the received radio waves, and means controlled in accordance with the scanned radio waves for producing a stereoscopic pair of likenesses of the object.

27. An electric system having, in combination, means for focusing radio waves from an object upon a pair of adjacently disposed regions, means comprising a plurality of radio-receiving-and-rectifying elements for receiving and rectifying the radio waves focused upon the said regions, electron-stream-producing-and-deflecting means for scanning the elements thereby to effect the scanning of the received radio waves, an electric circuit connected to the elements for receiving from the elements the energy of the scanned radio waves received and rectified thereby, cathode-ray-tube means having screen means and electron-stream-producing-and-deflecting means for scanning the screen means, means for synchronizing the scanning operation of the electron streams, and means controlled in accordance with the energy received in the said electric circuit for controlling the cathode-ray-tube-means electron-stream-producing-and-deflecting means to produce a stereoscopic pair of likenesses of the object upon the screen means.

28. An electric system having, in combination, means for transmitting radio waves toward an object, means for focusing the transmitted radio waves after reflection or scattering from the object, means for vibrating the focusing means between two limits of vibratory movement to focus the radio waves, at the said limits, upon a pair of adjacently disposed regions, radio-wave receiving means for receiving the radio waves focused upon the said regions, and means controlled in accordance with the received radio waves for producing a stereoscopic pair of likenesses of the object.

29. An electric system having, in combination, a cathode-ray tube comprising radio-receiving means and electron-stream-producing-and-deflecting means for scanning the radio-receiving means to effect the scanning of the received radio waves, means for focusing radio waves from an object upon the radio-receiving means, means for simultaneously moving the focusing means and the cathode-ray tube between two adjacently disposed regions in order that the radio-receiving means shall receive and the electron-stream-producing-and-deflecting means shall effect the scanning of the radio waves focused upon the said regions, and means controlled in accordance with the scanned radio waves for producing a stereoscopic pair of likenesses of the object.

30. An electric system having, in combination, a cathode-ray tube comprising radio-receiving means and electron-stream-producing-and-deflecting means for scanning the radio-receiving means to effect the scanning of the received radio waves, means for focusing radio waves from an object upon the radio-receiving means, and means for simultaneously moving the focusing means and the cathode-ray tube between two adjacently disposed regions in order that the radio-receiving means shall receive and the electron-stream-producing-and-deflecting means shall effect the scanning of the radio waves focused upon the said regions.

31. An electric system having, in combination, a pair of adjacently disposed means for receiving adjacently disposed radio-wave distributions from an object, and means for producing a stereoscopic pair of likenesses corresponding to the radio-wave energy of the radio-wave distributions received by the pair of radio-receiving means.

32. An electric system having, in combination, a pair of means for focusing radio waves from an object upon a corresponding pair of adjacently disposed regions, antenna means for receiving the radio waves focused upon the said regions, and means controlled in accordance with the radio waves received by the antenna means for producing a stereoscopic pair of likenesses of the object.

33. An electric system having, in combination, a pair of adjacently disposed means for focusing radio waves from an object upon a corresponding pair of adjacently disposed regions, means for receiving and scanning the radio waves focused upon the said regions, and means controlled in accordance with the scanned radio waves for producing a stereoscopic pair of likenesses of the object.

34. An electric system having, in combination, a pair of adjacently disposed means for focusing radio waves from an object upon a corresponding pair of adjacently disposed regions, means for receiving the radio waves focused at the said regions, means for scanning the receiving means, and means controlled in accordance with the scanning of the receiving means for producing a stereoscopic pair of likenesses of the object.

35. An electric system having, in combination, a pair of adjacently disposed means for focusing radio waves from an object upon a corresponding pair of adjacently disposed regions, means for preventing interference between the radio waves focused at the said adjacently disposed regions, means for receiving the focused radio waves at the said adjacently disposed regions, and means controlled in accordance with the radio waves received at the said adjacently disposed regions for producing a stereoscopic pair of likenesses of the object.

36. An electric system having, in combination, a pair of means for focusing radio waves upon a corresponding pair of adjacently disposed regions, cathode-ray-tube means having radio-receiving means for receiving the radio waves focused upon the said regions, and electron-stream-producing-and-deflecting means for scanning the radio-receiving means.

37. An electric system having, in combination, a pair of means for focusing radio waves upon a corresponding pair of adjacently disposed regions, cathode-ray-tube means having two sets of radio-receiving means, one set for receiving the radio waves focused upon each of the said regions and electron-stream-producing-and-deflecting means for scanning the radio-receiving means, and means for preventing interference between the radio waves focused upon the said regions.

38. An electric system having, in combination, a pair of means for focusing radio waves from an object upon a corresponding pair of adjacently disposed regions, and a pair of cathode-ray tubes each having radio-receiving means for respectively receiving the radio waves focused upon each of the said regions and electron-stream-producing-and-deflecting means for scanning the radio-receiving means.

39. An electric system having, in combination, a pair of means for focusing radio waves from an object upon a corresponding pair of adjacently disposed regions, cathode-ray-tube means having two sets of radio-receiving means, one set for receiving the radio waves focused upon each of the said regions, and electron-stream-producing-and-deflecting means for scanning the radio-receiving means to effect the scanning of the received radio waves, means for preventing interference between the radio waves focused upon the said regions, and means controlled in accordance with the scanned radio waves for producing a stereoscopic pair of likenesses of the object.

40. An electric system having, in combination, a pair of means for focusing radio waves from an object upon a corresponding pair of adjacently disposed regions, a pair of cathode-ray-tubes each having radio-receiving means for respectively receiving the radio waves focused upon each of the said regions and electron-stream-producing-and-deflecting means for scanning the radio-receiving means to effect the scanning of the received radio waves, and means controlled in accordance with the scanned radio waves for producing a stereoscopic pair of likenesses of the object.

41. An electric system having, in combination, means for focusing radio waves from an object upon a pair of adjacently disposed regions, cathode-ray-tube means having mosaic means comprising radio-receiving antenna elements for receiving the radio waves focused upon the said regions and electron-stream-producing-and-deflecting means for scanning the mosaic means, presentation cathode-ray-tube means having fluorescent viewing-screen means and electron-stream producing means for impinging electrons on the screen means, means for causing the electrons impinging on the screen means to scan the screen means in synchronism with the scanning of the mosaic means, and means responsive to the received waves for modulating the intensity of the electrons impinging on the screen means of the presentation cathode-ray-tube means to produce on the screen means a stereoscopic pair of likenesses of the object.

42. An electric system having, in combination, means for focusing radio waves from an object upon a pair of adjacently disposed regions, a plurality of radio-receiving elements for receiving the radio waves focused upon the said regions, cathode-ray-tube means having screen means and electron-stream-producing means for impinging electrons on the screen means, and means connected to the elements for controlling the electrons impinging on the screen means to produce a stereoscopic pair of likenesses of the object on the screen means.

43. An electric system having, in combination, a radio-wave generator, means for transmitting the generated radio waves toward an object, means for focusing the transmitted radio waves after reflection or scattering from the object upon a pair of adjacently disposed regions, means for receiving the radio waves focused upon the said regions, and means connected with the receiving means for producing a stereoscopic pair of likenesses of the object.

44. An electric system having, in combination, a radio-wave generator, means for transmitting the generated radio waves toward an object, means for focusing the transmitted radio waves after reflection or scattering from the object upon a pair of adjacently disposed regions, cathode-ray-tube means having mosaic means comprising radio-wave receiving elements for receiving the radio waves focused upon the said regions, electron-stream-producing-and-deflecting means for scanning the mosaic means, and means connected to the mosaic means and controlled in accordance with the scanning means for producing a stereoscopic pair of likenesses of the object.

45. An electric system having, in combination, means for focusing electromagnetic waves from an object, cathode-ray-tube means having electromagnetic-wave-responsive mosaic means and electron-stream-scanning means for scanning the mosaic means, means for shunting the focusing means back and forth between two extreme positions to produce displaced electromagnetic-wave images of the object upon the mosaic means at the extreme positions, means for causing the electron-stream-scanning means to effect a scan of the images focused upon the mosaic means at the times when the focusing means occupies each of the said two extreme positions, cathode-ray-display means having fluorescent-screen means and electron-stream-scanning means for scanning the fluorescent-screen means, means for synchronizing the operation of the said two electron-stream scanning means, and means responsive to the electron-stream scanning of the mosaic means for controlling the intensity of the electrons scanning the fluorescent-screen means in order to produce a pair of displaced visual images of the object upon the fluorescent-screen means.

46. An electric system having, in combination, a plurality of antenna radio-wave receiving elements, means for focusing adjacently disposed radio-wave images of an object on the antenna elements, means for causing the antenna elements to scan the radio waves of the focused radio-wave images, cathode-ray-tube means having screen means and electron-stream-scanning means for scanning the screen means, and means connected with the antenna elements and responsive to the scanned radio waves for controlling the electron-stream-producing means to produce a stereoscopic pair of likenesses of the object on the screen means.

47. An electric system having, in combination, means comprising a plurality of antenna radio-wave receiving elements and electron-stream-producing means for impinging electrons on the elements, means for focusing adjacently disposed stereoscopic radio-wave distributions on the radio-wave receiving elements, means for causing the electrons impinging on the elements to scan the elements thereby to scan the adjacently disposed radio-wave distributions, cathode-ray-tube means having fluorescent-screen means and electron-stream-producing means for impinging electrons on the screen means, means for causing the electrons produced in the cathode-ray-tube means to scan the screen means in synchronism with the scanning of the radio-wave receiving elements, and means responsive to the radio waves received by the scanned elements for modifying the intensity of the electrons scanning the cathode-ray-tube-means screen means, thereby to produce adjacently disposed visual reproductions of the adjacent radio-wave distributions on the screen means.

48. An electric system having, in combination, a plurality of normally ineffective antenna radio-receiving elements, means for producing adjacently disposed radio-wave images of an object upon the radio-receiving elements, electron-stream-producing means for impinging electrons on the elements, means for causing the electrons to scan the elements to render the elements successively effective thereby to scan successive portions of the adjacently disposed radio-wave images, cathode-ray-tube means having screen means and electron-stream-producing means for impinging electrons on the screen means, means for causing the electrons produced by the last-named electron-stream-producing means to scan the screen in synchronism with the scanning of the elements, means responsive to the radio waves received by the successively effective elements for producing successive portions of likenesses of the object on the screen means corresponding to the successive scanned portions of the adjacently disposed radio-wave images of the object, means for separating the likenesses corresponding to the radio-wave images at each of the said adjacently disposed regions, and means through which the likenesses may be viewed as a unit to produce a stereoscopic view of the object.

49. An electric system having, in combination, a plurality of normally ineffective antenna radio-receiving elements, means for focusing adjacently disposed radio-wave images of an object upon the radio-receiving elements, electron-stream-producing means for impinging electrons on the elements, means for causing the electrons to scan the elements thereby to render the elements successively effective, an electric circuit connected to the elements and responsive to the intensity of the radio-wave energy received by the elements as they are rendered successively effective, cathode-ray-tube means provided with screen means and electron-stream-producing means for impinging electrons on the screen means, means for causing the last-named electrons to scan successive portions of the screen means in synchronism with the rendering effective of the successive elements, means connected to the said electric circuit for modulating the intensity of the electrons scanning the screen means in accordance with the intensity of the radio waves received by the successively effective elements thereby to produce successive portions of likenesses of the object on the screen means, and means operating synchronously with the scanning means through which the likenesses may be viewed as a stereoscopic view.

50. An electric system having, in combination, a plurality of normally ineffective antenna radio-receiving elements for receiving from an object adjacently disposed stereoscopic distributions of radio waves, means for rendering the elements successively effective, display means, and means connected with the display means and controlled in accordance with the radio-wave energy received by the successively effective elements for producing upon the display means likenesses corresponding to the adjacently disposed radio-wave distributions, thereby to provide a stereoscopic pair of likenesses of the object.

51. An electric system having, in combination, a plurality of normally ineffective antenna radio-receiving elements for receiving adjacently disposed stereoscopic radio-wave images of an object, means for scanning the elements to render the elements successively effective, display means, and means controlled by the successively effective elements and responsive to the radio waves received thereby for producing upon the display means a stereoscopic pair of likenesses of the object.

52. An electric system having, in combination, a plurality of normally ineffective antenna radio-receiving elements for receiving from an object adjacently disposed stereoscopic distributions of radio waves, electron-stream-producing means, means for causing the electrons produced by the electron-stream-producing means to scan the elements thereby to render the elements successively effective, cathode-ray-tube means having screen means and electron-stream-producing means for impinging electrons on the screen means, means for causing the electrons impinging on the screen means to scan the screen means in synchronism with the scanning of the elements and means connected with the cathode-ray-tube means and controlled in accordance with the radio waves received by the successively effective elements for producing a stereoscopic pair of likenesses of the object on the screen means.

ROBERT H. RINES.

REFERENCES CITED

The following references are of record in the file of this patent:

UNITED STATES PATENTS

| Number | Name | Date |
|---|---|---|
| 1,699,270 | Baird | Jan. 15, 1929 |
| 1,781,799 | Baird | Nov. 18, 1930 |
| 1,873,926 | Centenon | Aug. 23, 1932 |
| 1,876,272 | Bayer | Sept. 6, 1932 |
| 2,083,292 | Cawley | June 8, 1937 |
| 2,107,464 | Zworykin | Feb. 8, 1938 |
| 2,212,923 | Miller | Aug. 27, 1940 |
| 2,225,097 | Cawley | Dec. 17, 1940 |
| 2,234,328 | Wolf | Mar. 11, 1941 |
| 2,306,272 | Levy | Dec. 22, 1942 |
| 2,355,110 | Rosenthal | Aug. 8, 1944 |
| 2,408,050 | De Rosa | Sept. 24, 1946 |
| 2,415,352 | Iams | Feb. 4, 1947 |
| 2,416,720 | Teal | Mar. 4, 1947 |
| 2,417,446 | Reynolds | Mar. 18, 1947 |
| 2,423,125 | Teal | July 1, 1947 |
| 2,426,189 | Espenchied | Aug. 26, 1947 |
| 2,428,351 | Ayres | Oct. 7, 1947 |
| 2,429,933 | Gibson | Oct. 28, 1947 |
| 2,434,897 | Ayres | Jan. 27, 1948 |
| 2,442,951 | Iams | June 8, 1948 |
| 2,449,542 | Ayres | Sept. 21, 1948 |
| 2,473,893 | Lyle | June 21, 1949 |
| 2,480,181 | Breen | Aug. 30, 1949 |

FOREIGN PATENTS

| Number | Country | Date |
|---|---|---|
| 552,582 | Great Britain | Apr. 15, 1943 |